United States Patent [19]

Rose

[11] Patent Number: 5,534,866
[45] Date of Patent: Jul. 9, 1996

[54] EMITTER FREQUENCY-TIME MEASUREMENT BY A MOVING OBSERVER USING NO NAVIGATION INPUT

[75] Inventor: Conrad M. Rose, Dahlgren, Va.

[73] Assignee: Litton Systems, Inc., Woodland Hills, Calif.

[21] Appl. No.: 499,825

[22] Filed: Jul. 10, 1995

[51] Int. Cl.⁶ .............................. G01S 7/40; G01S 7/285
[52] U.S. Cl. .............................................. 342/13; 342/99
[58] Field of Search .................................. 342/13, 89, 98, 342/99

[56] References Cited

U.S. PATENT DOCUMENTS

| | | | |
|---|---|---|---|
| 4,040,054 | 8/1977 | Overman | 342/13 |
| 4,146,892 | 3/1979 | Overman et al. | 342/20 |
| 4,209,835 | 6/1980 | Guadagnolo | 342/13 X |
| 5,285,209 | 2/1989 | Sharpin et al. | 342/424 |
| 5,291,199 | 3/1994 | Overman et al. | 342/13 |
| 5,343,212 | 8/1994 | Rose et al. | 342/424 |
| 5,396,250 | 3/1995 | Tsui et al. | 342/13 |
| 5,451,956 | 9/1995 | Lochhead | 342/13 |
| 5,457,466 | 10/1995 | Rose | 342/442 |

*Primary Examiner*—John B. Sotomayor
*Attorney, Agent, or Firm*—Gerald L. Lett

[57] ABSTRACT

A method for determining a constant classification parameter for a radar is described; this parameter uniquely characterizes and identifies the radar being monitored. The method does not require the use of navigation or orientation information concerning the observer platform. The emitter pulse repetition frequency (PRF) provides a clock signal to allow measurement of the number of cycles of emitter carrier occurring in a predetermined interval. This value is the same at the emitter and at the observer and forms the aforementioned classification parameter. The classification parameter is additionally used to detect the presence of countermeasures designed to defeat passive Doppler emitter location.

4 Claims, 3 Drawing Sheets

EMITTER FREQUENCY-TIME MEASUREMENT BY A MOVING OBSERVER USING NO NAVIGATION INPUT

BACKGROUND OF THE INVENTION

This invention generally relates to a technique for measuring of a radar signal in order to uniquely characterize, and thereby identify, the emitter. Moreover, the invention can be used to detect the presence of countermeasures employed by the radar, particularly those designed to defeat passive Doppler emitter location.

It is now typical for both time and frequency measurements to be made on a radar's signal from an observer that may be a unmanned aerial vehicle (UAV). UAV's typically have rudimentary navigation systems, so it is desirable to measure a classifying parameter that does not depend on accurate knowledge of observer kinematics or angular attitude. An apparatus and method for doing this is also valuable for use on more sophisticated high performance aircraft, since it can be used as a stand-alone system and does not require costly integration and testing for its incorporation.

Many time and frequency parameters currently used in identifying radar systems such as signal pulse width, signal RF frequency, and pulse repetition time interval make significant demands on the observer navigation systems. These parameters are all related to two parameters of particular interest for many pulse echo radars: the emitter's rest frequency $f_0$ and rest pulse repetition interval fundamental time difference $t_{po}$. This time difference is the greatest common divisor of all the interpulse time intervals. It determines the time intervals between the pulses (300, FIG. 3). The inverse of this fundamental time difference is the pulse repetition frequency or PRF. The integer multiples of $t_{po}$ that form the time differences between the pulses are called pulse repetition intervals or PRI (301, 302 FIG. 3). The parameters $f_0$ and $t_{po}$ are typically unique to a radar type and thus provide an excellent means of classification. FIG. 1 shows how these parameters are generated in a typical pulse amplifier radar.

In this figure the RF and PRF frequencies are synthesized from a single reference oscillator 100 according to the method discussed by Taylor and Mattern, page 5–15, in the 1970 edition of Skolnik's *Radar Handbook*. As Taylor and Mattern note, although possible variations in design are almost limitless, the frequency generation method shown resembles many actual systems. This frequency generation method involves multiplying up from the reference frequency $f_r$ 101 by integer multiples to get the coherent local oscillator frequency 111, and RF carrier frequency 121, and dividing by an integer amount to get the PRF frequency 131.

A problem in measuring $f_0$ and $t_{po}$ for the pulsed amplifier radar shown in FIG. 1 is that the reference oscillator 100 may change, either due to a repair or to a conscious attempt to prevent classification. For instance, if the crystal is replaced in the oscillator, the reference frequency $f_r$ will change and hence all frequencies derived from it change.

Additional problems measuring these parameters arise from the motion of the observing aircraft. The observing aircraft does not measure either quantity directly, but rather their Doppler shifted values. These values are derived in many textbooks, e.g Landau and Lifshitz, *The Classical Theory of Fields*, $4^{th}$ edition, page 117, and are, for frequency measurements $$f = f_0 \left( \beta \left( 1 - \frac{\vec{v}\cdot\vec{u}}{c} \right) \right)^{-1} \quad (1)$$

or, for time difference measurements $$t_p = t_{po} \beta \left( 1 - \frac{\vec{v}\cdot\vec{u}}{c} \right) \quad (2)$$

where $\beta$ is the relativistic factor $$\beta = \left( 1 - \left(\frac{v}{c}\right)^2 \right)^{1/2}$$

and $\vec{v}$=observer velocity v=observer speed $\vec{u}$=emitter signal direction of arrival unit vector.

The equations for $f$ and $t_p$ are often approximated by neglecting terms to second and higher order in v/c, giving for example $$f = f_0 \left( 1 + \frac{\vec{v}\cdot\vec{u}}{c} \right).$$

However, as will be seen, such approximations are not needed here.

Extracting the RF and PRF rest frequencies from these Doppler shifted measurements typically requires a sophisticated ESM system. For example, both precision navigation information to characterize $\vec{v}$ and means to simultaneously measure the emitter signal direction of arrival or DOA $\vec{u}$ are needed. Such systems are heavy, costly, and are not typically
available on unmanned aircraft.

It is, therefore, an object of this invention to provide a method for measuring a classifying parameter of a radar emitter without requiring information regarding the emitter's relative bearing or other navigation data.

Another object of this invention is to provide a method for measuring a classifying parameter like the one described above which may be used to detect countermeasures employed by the radar emitter particularly designed to defeat passive Doppler emitter location techniques.

SUMMARY OF THE INVENTION

The foregoing and other objects are obtained in a method for measuring a classifying parameter for a radar emitter that does not require precise navigation data inputs or knowledge of the emitter's relative bearing. To find this parameter, assume the following Gedanken experiment performed at the emitter. A clock is used to measure off a time interval $\Delta T_0$, and the number of waves in the signal of frequency $f_0$ occurring in the time interval $\Delta t$ is measured. This quantity, $$f_0 \, \Delta t = N_c \; [\textit{number of cycles during the time interval}]$$

is independent of the motion of the coordinate system in which the time and frequency is being measured, even though the individual frequency and time difference values measured do depend on the coordinate system's motion. Therefore $f_0 \Delta t_o$ represents a relativistic constant, as noted by Max Born in *Einstein's Theory of Relativity*, page 121 (Dover Publications, 1965). The invention utilizes this fact by noting the emitter PRF provides a clock both at the radar, and at any intercept receiver, that can be used to measure the number of cycles of the RF carrier frequency in the time interval $t_p$ and that this value must be the same at the radar and at the observer. Of course other periodic events in the signal, for example the frame repetition interval or FRI can be used in place of $t_p$. But because in many radars, such as the pulse amplifier radar of FIG. 1, $t_{po}$ generates the FRI, $t_p$ is a more fundamental parameter and hence the parameter of choice as a "clock" for measuring time differences in this invention.

Note that equivalently the ratio of emitter rf carrier frequency to pulse repetition frequency is a relativistic constant, and that the constant nature of the time-frequency product or frequency ratio, besides being known a priori on the well established theoretical grounds just given, is also readily verified by a simple explicit calculation. Consider Equation (1) and Equation (2). From these equations the time-frequency product at the observer satisfies $$f t_p = f_o t_{po} \tag{3}$$

That is, the Doppler and relativistic dilations perfectly cancel if the signals are measured at the same time. This is illustrated below in FIG. 4. In that figure the product of frequency 400 and time difference 402, both measured in the rest frame of the transmitter, give the wave train 40 1 consisting of 407 $N_c$ cycles, where in this example $N_c$ equals 4.75. When the time events that determined $\Delta t_o$ are measured in the moving frame, giving 404 $\Delta t$, the time interval has expanded according to Equation (2), but the frequency measured in the moving frame is higher according to Equation (1). The net result is that the number of cycles in the wave train of temporal length 404, found by the product 406, is still 4.75 cycles.

An important consequence of the constant nature of this time-frequency product is that no knowledge of observer kinematics and angular orientation, or knowledge of the emitter bearing, is needed for a moving observer to extract the ratio of emitter rest frequency and rest PRF.

This invention to exploits the fact that since the quantity being measured is a relativistic constant, and so does not change during any motion of the observer, the observer's system clock can fully replace all inputs from the navigation system. The system clock allows measurements of $f$ and $t_p$ to be matched in time, and when measurements of these two quantities made close together in time are multiplied, all effects due to the observer's motion essentially cancel.

Furthermore, the product in Equation (3) can be related to the internal frequency synthesis circuitry of many pulsed amplifier radars. For the generic system pictured in FIG. 1 the product in Equation (3) equals the product MNP of integers involved in the frequency generation circuit 10, since $$f_o t_{po} = [NMf_r] \frac{P}{f_r} = NMP \tag{4}$$

An important feature of this invention is to use the fact this integer product does not change when modifications are made to the reference oscillator (100, FIG. 1) or change even if that oscillator has frequency instabilities due to thermal or other effects during the course of making the pulse time and RF frequency measurements.

One way the constant nature of the product in Equation (3), and in particular the special case of Equation (4) is used is to provide a specific emitter identification parameter that characterizes the emitter as belonging to a certain specific model of radar system, and that will not change from day to day.

Another way the invention uses the constant nature of the time-frequency product is to provide a very accurate estimate of the quantity. Since, as just noted, the time-frequency product in Equation (3), or equivalently RF to PRF ratio is both theoretically constant if the reference frequency is stable, and also in a practical sense proof against frequency instabilities by the nature of common frequency synthesizer circuitry which gives the product of integers of Equation (4), $f_o t_{po}$ can be estimated very accurately by simple statistical averaging.

The invention uses the constant nature of the time-frequency product to detect changes in the PRF or RF introduced over time as a counter measure by the radar to passive Doppler ranging techniques. If these frequency variations are applied to either the PRF or RF alone, they will restfit in a deviation of the time-frequency product from its expected constant value, and hence the presence of such countermeasures can be detected. Radars which are amenable to passive location by Doppler methods are also amenable to specific emitter identification by this invention, and so this test for counter measures is a natural one to apply to them.

The manner the product in Equation (3) is formed from ESM intercept receiver frequency and pulse time-of-arrival measurements so that the above objects are accomplished, and also the manner the product in Equation (4) is related to frequency synthesis circuits in many pulse amplifier radars, will be clear from the detailed description of the invention given below.

BRIEF DESCRIPTION OF THE DRAWINGS

FIG. 4 including

DETAILED DESCRIPTION

Figure 1:
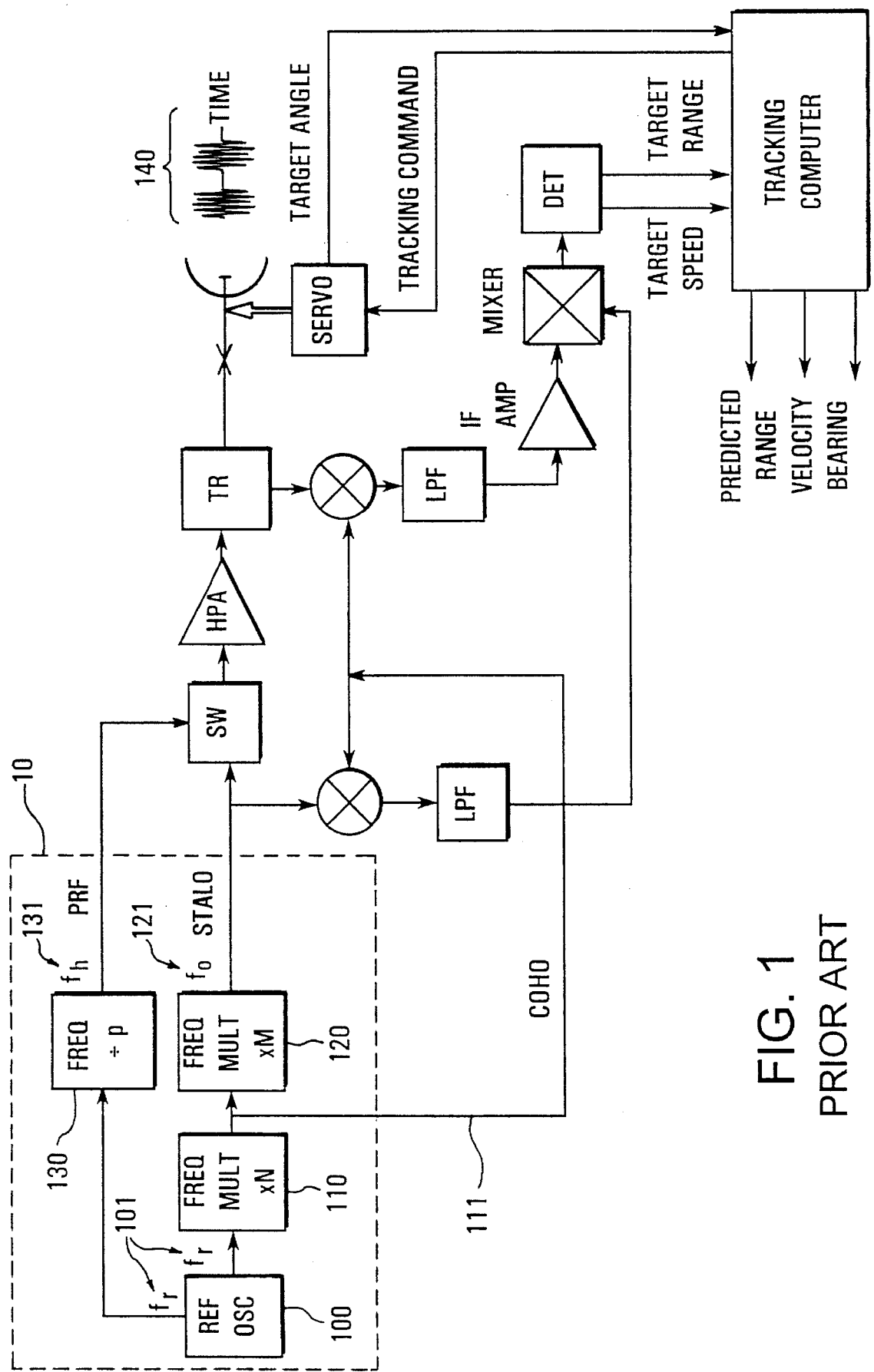
FIG. 1 is a block schematic diagram of a prior art pulsed amplifier radar with a frequency synthesis section 10 that resembles that of many actual systems.
Figure 2:
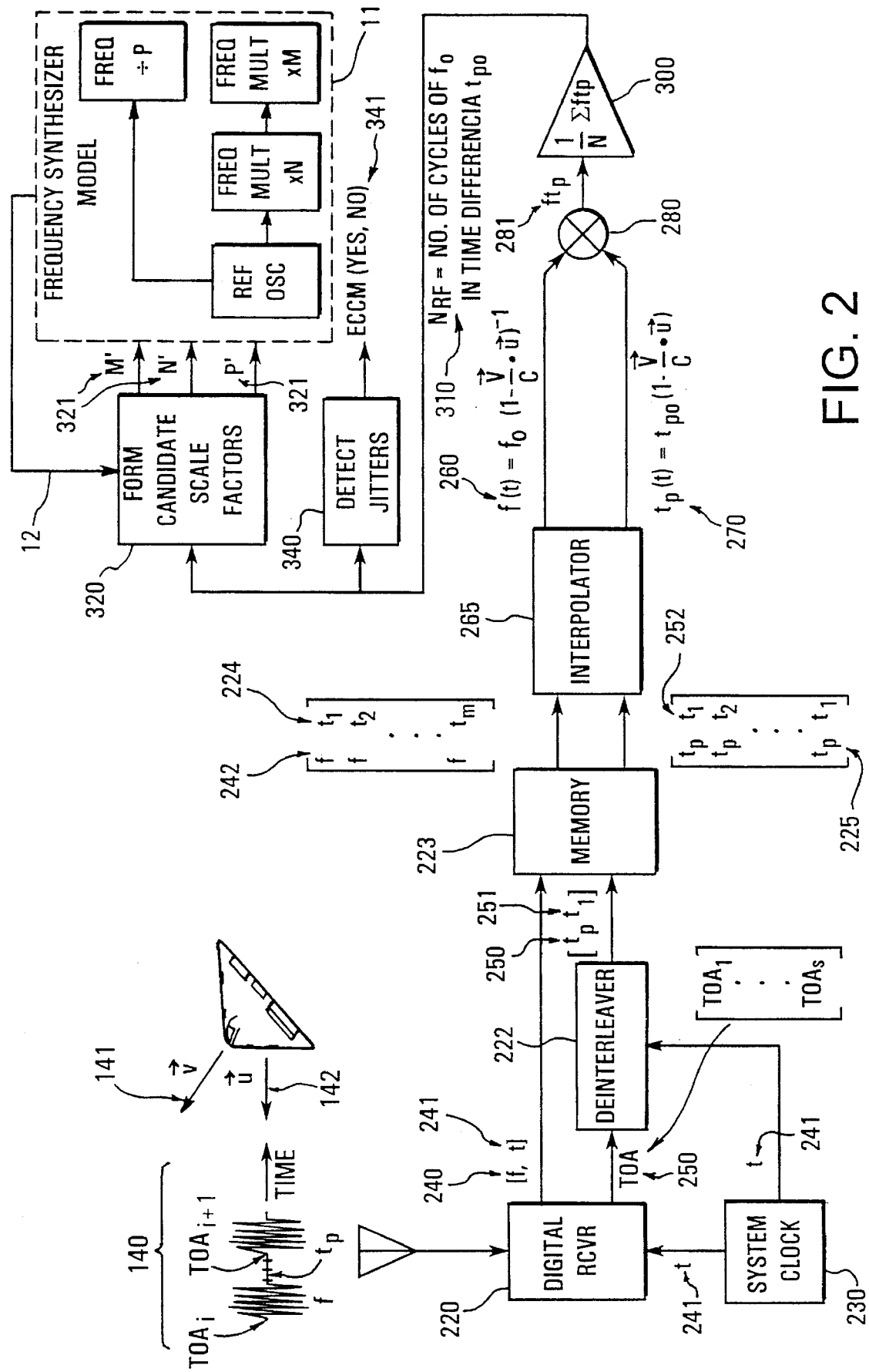
FIG. 2 is a block schematic diagram of a preferred embodiment of the invention as applied to the FIG. 1 radar system.
Figure 3:
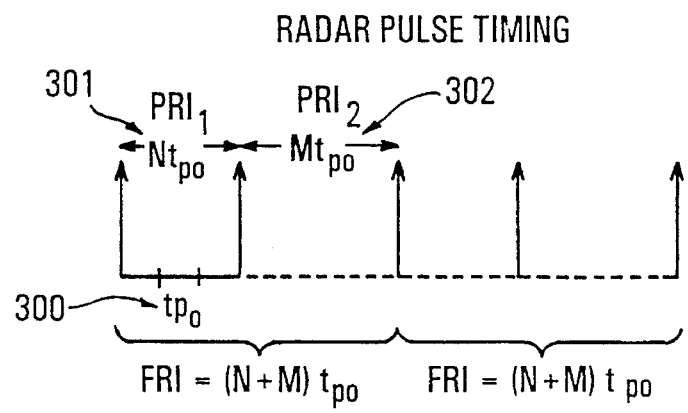
FIG. 3 is a radar pulse timing diagram illustrating the relation between $t_p$, the pulse repetition interval, and frame repetition interval.
Figure 4A:
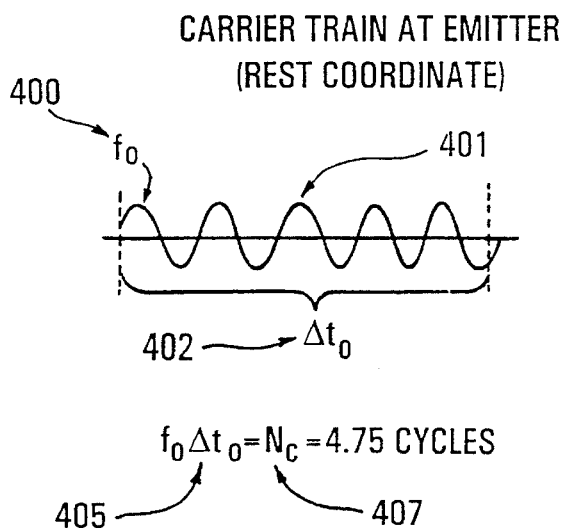
FIGS. 4a and 4b are emitter carrier frequency diagrams illustrating the constancy of the number of waves in a pulse train as measured in a stationary reference frame, and in a moving reference frame, as taught by the Special Theory of Relativity.
Figure 4B:
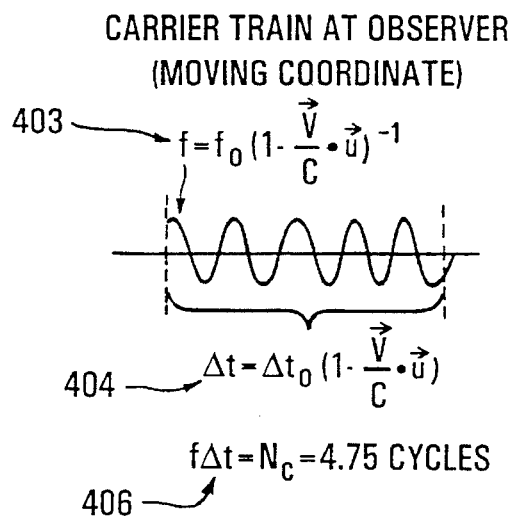

This invention may be realized as either an analog, a digital, or analog-digital hybrid system, as will be apparent to those skilled in the art. FIG. 2 illustrates an essentially digital realization in which a digital receiver 220, such as the Advanced Digital receiver built by Litton Industries Applied Technologies Division, is used to make emitter carrier frequency and pulse time-of-arrival (TOA) measurements on the signal 140 emitted by the pulsed amplifier radar shown in FIG. 1. The frequency measurements 240 and times 241 the measurements are stored as a record in memory 223. Time is obtained from the system clock 230. The TOA measurements are processed in the deinterleaver 222. This deinterleaver has the capabilities of the Litton Industries Amecom Division's Advanced ADVCAP deinterleaver developed for the AN/ALQ-99 jamming system, and hence extracts $t_p$ from the TOA measurements. The system dock 230 provides the time the estimate of $t_p$ was made, and this time 251 and estimate 250 are both stored as a record in memory 223.

By the very nature of the manner frequency and $t_p$ are measured, the times 252 and 224 in the data records 242 and 225 will generally be close together. The invention requires that "simultaneous" estimates of $f$ 260 and $t_p$ 270 are multiplied at 280 together, but simultaneous for this invention means within a millisecond or so. This synchronization is not stringent and is readily achieved in current ESM systems. This millisecond time constraint is derived from the requirement that 142 $\vec{u}$ and 141 $\vec{v}$ in Equation (1) and Equation (2) not differ appreciably between the two measurements.

The synchronization is achieved by interpolation. Since both $f$ and $t_p$ are smooth functions they are capable of accurate interpolation, given the data histories 242 and 225. The frequency and "simultaneous" time difference measurements are then multiplied together at 280 and the resulting product averaged at 300. This averaging process can extend over all the data collected, since the value 281 is ostensibly the same constant no matter when the measurement is made, and hence the requirements on the performance of the digital receiver 220 are much reduced from those normal in ESM time and frequency measurements.

For many pulsed echo radars $N_{rf}$ 310, the number of cycles of the emitter rest carrier frequency $f_0$ occurring in time interval $t_{po}$ is a valuable classifying parameter. However, for the pulse amplifier radar of FIG. 1 the underlying quantity being estimated is the product of integers in Equation (4), and further refinement is possible. For these radars it is desirable to identify the frequency synthesis circuit. A generic example of this circuit is shown in FIG. 1 at 10, and the corresponding generic form is assumed in FIG. 2 at 11. It is clear that more elaborate forms may be assumed, depending on knowledge of the specific radar. The prime factors of $N_{rf}$ are formed in 320 and recombined in all ways consistent with the form of the frequency synthesis circuit 11 that was assumed, and also consistent with good engineering practice. This may be implemented as an expert system, with feedback path 12 indicating the iterations in the testing process. This leads to a set of integers 321 whose product is $N_{rf}$ which could be used to realize circuit 11.

The jitter detector 320 compares the measured product $N_{rf}$ with its averaged value. By means of well known statistical test it detects significant deviations between the two that indicate either the RF or PRF frequency is being jittered. The output 341 represents a flag set to indicate the presence of this electronic counter-countermeasure, or ECCM.

The principles of the invention are described hereinabove by describing a preferred embodiment constructed accordingly. The described embodiment may be modified or changed in a number of ways apparent to those skilled in the art.

I claim:

1. A method for extracting a radar classification parameter requiring no navigational or orientation information concerning the observer, comprising the steps of:

measuring, at the observer, Doppler-shifted emitter RF frequency ($f$) and pulse times-of-arrival (TOA), determining the times of individual frequency measurements of f relative to the received signal, storing the results of said measuring determining steps, extracting from the stored TOA information a periodic event representing an invariant time interval at the emitter, this event defining an interpulse repetition of patterns in the emitter signal (referred to as $t_{po}$ at the emitter, and $t_p$ at the observer), recording the times, respectively, of the individual periodic event difference measurements $t_p$ relative to the received emitter signal, interpolating the simultaneous values of $f$ and $t_p$ relative to the receiving emitter signal, and forming the product of those values, forming a product signal representing the number of cycles in the RF carrier rest frequency that would be measured at the emitter in the time interval $t_{po}$, said product being the multiplied simultaneous value of $f$ and $t_p$, thereby forming said classification parameter.

2. The method described in claim 1 comprising the additional step of:

estimating a conditional value for said product signal to offset errors in said measuring and interpolating steps due to thermal noise and the like.

3. The method described in claim 2 wherein said product signal is representative of a frequency synthesizer driving the emitter, and comprising the additional steps of:

factoring said estimated time-frequency product signal into all prime factors making up the synthesized emitter signal and forming at least one product signal of said prime factors which represent the frequency synthesis chain in the frequency synthesizer consistent with the interpolated time-frequency signal.

4. The method described in claim 1 comprising the additional steps of:

comparing said interpolated product signal and said estimated product signal to form a difference signal, and statistically detecting in said difference signal a significant bias whereby radar countermeasures which consist of varying RF or PRF of the emitter 12 signal by amounts which are sufficiently small in relation to the nominal values for the emitter signal that those variations appear as normal Doppler shifts.

\* \* \* \* \*